Patented Aug. 11, 1936

2,050,704

UNITED STATES PATENT OFFICE 2,050,704

PROCESS OF PRODUCING N-SUBSTITUTION PRODUCTS OF 1,4-DIAMINOANTHRAQUINONES

Karl Koeberle, Robert Schweizer, and Christian Steigerwald, Ludwigshafen-on-the-Rhine, Germany, assignors to General Aniline Works, Inc., New York, N. Y., a corporation of Delaware No Drawing. Application September 10, 1934, Serial No. 743,481. In Germany September 19, 1933

26 Claims. (Cl. 260—60)

The present invention relates to N-substitution products of 1,4-diaminoanthraquinones and a process of producing same.

We have found that N-substitution products of 1,4-diaminoanthraquinones can be obtained by condensing a stable reduction product of a 1,4-diaminoanthraquinone with at least two different amines corresponding to the formula $R.NH_2$, wherein R stands for —OH, —$NH_2$, —NH-aryl or an alkyl, aralkyl, cycloalkyl or heterocyclic radicle. The organic radicles therein may contain further substituents as for example halogen atoms, amino, alkylamino, arylamino, acylamino, nitro, hydroxy, alkoxy, aryloxy, acyl, cyano, mercapto, thiocyano, carboxylic or sulphonic acid or aldehyde groups. The amines may be employed as such or in the form of their salts with mineral acids.

The condensation usually takes place without the addition of a condensing agent and at atmospheric pressure, ammonia being evolved. If heterocyclic amines are employed, it is, in many cases, of advantage to carry out the condensation in the presence of mineral acids such as halogen hydrides, sulphuric acid or nitric acid. The condensation may be carried out in the presence of an inert diluent, as for example water, aliphatic alcohols, hydrocarbons, halogenated or nitrated hydrocarbons, ethers, ketones, aliphatic carboxylic acids of low molecular weight, such as formic, acetic or propionic acid, esters or other suitable organic diluents. When working in the presence of air or oxygen, especially when the amines are employed in excess, the 1,4-diaminoanthraquinones containing different substituents in the amino groups are obtained as reaction products. In other cases the corresponding stable reduction products are obtained which are converted, preferably without isolation, into the corresponding 1,4-diaminoanthraquinones in one operation by oxidation, as for example by leading in air or oxygen or by treatment with iron chloride or other suitable oxidizing agents, preferably in the presence of copper, copper salts or salts of vanadic acid. The oxidation is preferably carried out with the addition of a secondary or tertiary amine, piperidine being specially suitable. Besides the stable reduction product of 1,4-diaminoanthraquinone itself, the stable reduction products of 1,4-dialkylaminoanthraquinones, 1,4-diaminoanthraquinones which are substituted in the 5- and/or 8-position by hydroxy, alkoxy, amino or alkylamino groups or of 1,4-diaminoanthraquinones which are substituted in at least one of the positions 2 and 3 by halogen atoms or hydroxy, alkoxy, phenoxy, alkyl, carboxylic acid, carbonamide or cyano groups may be employed as initial materials. These stable reduction products will hereinafter briefly be named "leuco" compounds.

Amines suitable for the condensation are for example hydroxylamine, hydrazine, phenylhydrazine, naphthylhydrazine, nitrophenylhydrazine, phenylhydrazine carboxylic acid, semicarbohydrazide, the primary alkylamines, such as methylamine, ethylamine, ethylene diamine, propylamine ($HO.CH_2$—$CH_2$—$NH_2$), normal butylamine, isobutylamine, dodecylamine, ethanolamine ($HO.CH_2.CH_2$—$NH_2$), propanolamine $(HO.CH_2$—$CH_2$—$CH_2$—$NH_2)$, butanolamine ($HO.CH_2.CH_2.CH_2.CH_2$—$NH_2$) and the primary halogenalkylamines. Aralkylamines, as for example benzylamine and phenylethylamine ($C_6H_5$—$CH_2$—$CH_2$—$NH_2$), ω - amino - 1 - methylnaphthalene and cycloalkylamines, as for example cyclohexylamine, aminotetrahydronaphthalene and their substitution products, heterocyclic amines, as for example aminopyridines, aminoquinolines, aminonaphthoquinolines, aminocarbazoles, aminodiphenylene oxide, aminoacridines, aminoacridones and their derivatives may also be employed.

The production of the 1,4-diaminoanthraquinones substituted in one amino group by an alkyl radicle and in the other amino group by an —OH, —$NH_2$ or —NH-aryl group or an aralkyl, cycloalkyl or heterocyclic radicle may also be effected by treating the stable reduction products of 1,4-di-mono-alkylaminoanthraquinones with less than 2 molecular proportions of an amine corresponding to the general formula R—$NH_2$ wherein R stands for an —OH, —$NH_2$ or —NH-aryl group or an aralkyl, cycloalkyl or heterocyclic radicle. In these cases, instead of ammonia the alkylamine corresponding to the alkyl radicle of the 1,4-di-mono-alkylaminoanthraquinone employed as initial material is split off.

The reaction products are usually obtained in very good yields, excellent purity and in crystalline form. They may be employed in part as dyestuffs for dyeing acetyl cellulose or for coloring artificial compositions of various kinds, benzine or petroleum, lacquers, oils, waxes and paraffin waxes, and in part as intermediate products for the preparation of dyestuffs. If the products contain sulphonic acid groups which may be present in the initial materials or may be introduced by a subsequent treatment with sulphonating agents, they are suitable for dyeing animal fibres and, in some cases, for dyeing vegetable fibres.

The following examples will further illustrate how the said invention may be carried out in practice but the invention is not restricted to these examples. The parts are by weight.

Example 1

49 parts of leuco-1,4-diaminoanthraquinone, 16.9 parts of 95 per cent butylamine, 14.6 parts of 92 per cent ethanolamine, and 200 parts of ethanol are boiled, while stirring, in a vessel provided with a reflux condenser. In the course of some hours leuco-1-butylamino-4-hydroxyethylamino-anthraquinone is formed, ammonia being split off. The leuco compound is not isolated, but 0.5 part of cupric acetate and 3 parts of piperidine are added. Oxygen or air is led through the boiling solution until the leuco compound is completely oxidized to the dyestuff. It is obtained in the form of a fine crystalline brown-violet powder and dyes cellulose acetate green-blue shades.

Example 2

24.5 parts of leuco-1,4-diaminoanthraquinone, 8.5 parts of normal butylamine and 15 parts of a 25 per cent aqueous solution of methylamine are mixed with 200 parts of methanol. The mixture is boiled, while stirring, until ammonia no longer escapes. To the mixture 0.5 part of copper acetate and 4 parts of piperidine are added. A stream of oxygen is led through the boiling mixture for several hours. When the solution has assumed a blue coloration, it is allowed to cool. The precipitate formed is filtered off by suction. The thus obtained 1-methyl-amino-4-normal butylaminoanthraquinone is a blue powder which dyes cellulose acetate blue shades.

Example 3

15 parts of a 25 per cent aqueous solution of methylamine and 11.8 parts of benzylamine are introduced into a suspension of 24.5 parts of leuco-1,4-diaminoanthraquinone in 200 parts of methanol. The suspension is boiled, while stirring, under reflux until ammonia no longer escapes. After adding 0.5 part of copper acetate and 3 parts of piperidine, oxygen is led through the solution until the oxidation of the leuco compound is complete. After cooling the dyestuff is sucked off, washed with methanol and dried, 1-methyl-4-benzylaminoanthraquinone is obtained in the form of a violet powder which dyes acetyl cellulose blue shades.

Example 4

24.5 parts of leuco-1,4-diaminoanthraquinone are suspended in 200 parts of methanol. After the addition of 7.3 parts of mono-ethanolamine and 11.8 parts of benzylamine the suspension is further treated in the manner described in Example 3. 1-hydroxyethylamino-4-benzylaminoanthraquinone is obtained in the form of a blue powder which dyes acetyl cellulose blue shades.

Example 5

A mixture of 24.5 parts of leuco-1,4-diaminoanthraquinone, 15 parts of a 25 per cent aqueous solution of methylamine, 11 parts of cyclohexylamine and 200 parts of methanol is boiled in the presence of air until ammonia no longer escapes. After cooling, the thus formed 1-methylamino-4-cyclohexylaminoanthraquinone is sucked off and dried. It is a blue powder.

Example 6

In a solution of 11 parts of cyclohexylamine and 7.2 parts of 94 per cent mono-ethanolamine in 200 parts of methanol, 24.5 parts of leuco-1,4-diaminoanthraquinone are suspended. The suspension is boiled, while stirring, until ammonia no longer escapes. After adding 0.5 part of copper acetate and 3 parts of piperidine, air is led through the boiling solution until the formation of the dyestuff is complete. After cooling, it is filtered off by suction. A blue powder is obtained in a good yield which dyes acetyl cellulose blue shades. It is probably 1-hydroxyethylamino-4-cyclohexylaminoanthraquinone.

Example 7

A mixture of 24.5 parts of leuco-1,4-diamino-anthraquinone, 11.8 parts of benzylamine, 11 parts of cyclohexylamine and 200 parts of methanol are boiled under reflux until ammonia no longer escapes. After adding 0.5 part of copper acetate and 3 parts of piperidine a stream of oxygen is led through the yellow-green suspension until the oxidation of the leuco compound to form the blue dyestuff is complete. It is filtered off by suction and washed with methanol. After drying a blue powder is obtained which most probably is 1-benzylamino-4-cyclohexylamino-anthraquinone.

Example 8

24.5 parts of leuco-1,4-diaminoanthraquinone are introduced into a solution of 4.4 parts of hydrazine hydrate and 15 parts of a 25 per cent aqueous solution of methylamine in 245 parts of methanol. The mixture is boiled under reflux, while stirring, for 6 hours. After cooling, the reaction product is filtered off by suction, washed with ether and dried. A red-brown crystalline powder is obtained which dissolves in concentrated sulphuric acid giving an orange coloration. It dissolves in warm nitrobenzene giving a deep orange coloration.

Example 9

A suspension of 24.5 parts of leuco-1,4-diamino-anthraquinone in a mixture of 15 parts of a 25 per cent aqueous solution of methylamine, 7.2 parts of mono-ethanolamine and 250 parts of ethanol is boiled, while stirring, until initial material is no longer detectable. Oxygen is then led through the boiling solution until the leuco compound is converted into the blue dyestuff. After cooling, it is filtered off by suction, washed with water and dried. It dyes acetyl cellulose blue shades. It is 1-hydroxyethylamino-4-methylaminoanthraquinone.

When instead of the aqueous solution of methylamine 16.5 parts of a 33 per cent aqueous solution of ethylamine are used, the 1-hydroxyethyl-amino-4-ethylaminoanthraquinone is obtained. It dyes acetyl cellulose blue shades.

Example 10

24.5 parts of leuco-1,4-diamino-anthraquinone are suspended in 245 parts of methanol and, after adding 11.8 parts of benzylamine and 13.3 parts of beta-phenylethylamine, the suspension is boiled, while stirring, until leuco-1,4-diamino-anthraquinone can no longer be detected. Then 0.5 part of copper acetate and 3 parts of piperidine are added. Air is led through the solution until the oxidation is complete. After cooling, the precipitated crystals are filtered off by suction and washed with ethanol. According to analysis, the reaction product is 1-benzylamino-4-beta-phenylethylamino-anthraquinone; it dyes cellulose acetate reddish blue shades.

Example 11

24.5 parts of leuco-1,4-diamino-anthraquinone are suspended in 245 parts of methanol. After adding 4.4 parts of hydrazine hydrate and 11.9 parts of phenyl hydrazine, the suspension is boiled, while stirring, until ammonia no longer escapes. The reaction product precipitates in the form of red-brown crystals. After cooling, the crystals are filtered off by suction, washed with ether and dried. A red-brown crystalline powder is obtained which is difficultly soluble in methanol. It is readily soluble in nitrobenzene giving an orange coloration and in concentrated sulphuric acid giving a yellow-brown coloration.

Example 12

24.5 parts of leuco-1,4-diamino-anthraquinone are suspended in 200 parts of ethanol. After adding 8.5 parts of normal butylamine of 95 per cent strength and 11.8 parts of benzylamine, the suspension is boiled, while stirring, until the starting material has disappeared. After adding 0.5 part of copper acetate and 3 parts of piperidine, oxygen is led through the boiling solution until it has turned blue. After cooling, the reaction product is filtered off by suction and washed with water. It is a blue powder which dyes acetate silk blue shades. It is 1-normal-butylamino-4-benzylamino-anthraquinone.

Example 13

24.5 parts of leuco-1,4-diamino-anthraquinone are suspended in 245 parts of ethanol. After adding 13.3 parts of beta-phenylethylamine and 15 parts of a 25 per cent aqueous solution of methyl amine, the suspension is boiled under reflux, while stirring, until the initial material has disappeared, which is the case after about 4 to 5 hours. After adding a solution of 0.5 part of copper acetate in 3.0 parts of piperidine, oxygen is led through the boiling solution until it has become blue. After cooling, the reaction product is filtered off by suction and washed with water. It is obtained in the form of beautiful blue crystals. The thus obtained 1-methylamino-4-beta-phenylethylamino-anthraquinone, dyes cellulose acetate blue shades.

Example 14

24.5 parts of leuco-1,4-diamino-anthraquinone are suspended in 200 parts of methanol. After adding 8.5 parts of normal butylamine of 95 per cent strength and 11 parts of cyclohexylamine, the suspension is boiled for 6 hours while stirring. Then 0.5 part of copper acetate and 3 parts of piperidine are added. Oxygen is then led through the solution until the oxidation is complete. After cooling, the violet prisms of the dyestuff formed are filtered off by suction, washed with a slight amount of methanol and water. The product being probably the 1-butylamino-4-cyclohexylamino-anthraquinone dyes cellulose acetate blue shades.

Example 15

24.5 parts of leuco-1,4-diamino-anthraquinone are suspended in 245 parts of methanol. After adding 13.3 parts of beta-phenylethylamine and 10.8 parts of cyclohexylamine, the suspension is boiled, while stirring, until ammonia no longer escapes. After the addition of 0.5 part of copper acetate and 3 parts of piperidine oxygen is led through the boiling solution until the conversion of the leuco compound into the dyestuff is complete. After cooling, the dyestuff is filtered off by suction, washed with methanol and water and dried. It is a blue crystalline powder dyeing cellulose acetate reddish-blue shades. It is probably the 1-beta-phenylethylamino-4-cyclohexyl-aminoanthraquinone.

Example 16

A mixture of 24.5 parts of leuco-1,4-diamino-anthraquinone, 4.4 parts of hydrazine hydrate, 10.8 parts of cyclohexyl amine and 245 parts of methanol is boiled, while stirring, until ammonia no longer escapes. The reaction product separates in the form of red-brown crystals. After cooling, it is filtered off by suction and washed with ether. It is a crystalline yellowish-brown powder which dissolves in concentrated sulphuric acid, in nitrobenzene and in trichlorbenzene giving a red coloration. By dissolving it in any of the latter solvents and warming the solution the coloration turns orange.

Example 17

24.5 parts of leuco-1,4-diamino-anthraquinone are suspended in 245 parts of methanol. After adding 11.8 parts of benzylamine and 4.4 parts of hydrazine hydrate the suspension is boiled, while stirring, until ammonia no longer escapes. After cooling, the red-brown crystals of the reaction product are filtered off by suction, washed with ether and dried. They dissolve in concentrated sulphuric acid giving an orange coloration and in nitrobenzene and in trichlorbenzene giving first a somewhat blue coloration which turns red when heating the solution.

Example 18

A mixture of 245 parts of methanol, 24.5 parts of leuco-1,4-diaminoanthraquinone, 13.3 parts of beta-phenylethylamine and 11.9 parts of phenyl-hydrazine is boiled, while stirring, until the evolution of ammonia has ceased. The reaction product crystallizes out in the form of coarse yellowish-brown crystals. After cooling, the reaction product is filtered off by suction and washed with ether. It is obtained in an almost quantitative yield. It forms a brownish-yellow crystalline powder which dissolves in concentrated sulphuric acid giving a green coloration, in trichlorbenzene and in nitrobenzene giving a yellowish-green solution, this latter solution turning yellowish-brown when heated. The product probably is the leuco-1-phenyl-hydrazine - 4 - beta-phenylethylamino-anthraquinone.

Example 19

A mixture of 24.5 parts of leuco-1,4-diamino-anthraquinone, 11.8 parts of benzylamine, 7.7 parts of the hydrochloride of hydroxylamine and 150 parts of methanol are boiled, while stirring, until initial material can no longer be detected. After cooling, the reaction product is filtered off by suction, washed with ether and dried. It is a blue crystalline powder having an intensely green superficial lustre. It dissolves in concentrated sulfuric acid giving a weakly yellowish coloration in nitrobenzene and trichlorbenzene giving a blue coloration. It dyes cellulose acetate reddish-blue tints. It dissolves but weakly in warm caustic soda solution giving a brownish coloration.

Example 20

A mixture of 24.5 parts of leuco-1,4-diaminoanthraquinone, 10.8 parts of cyclohexylamine, 7.7 parts of the hydrochloride of hydroxylamine and 150 parts of methanol is boiled, while stirring, until initial material is no longer detectable. The reaction product separates in the form of brown crystals. After cooling, the product is filtered off by suction, washed with ether and dried. It dissolves in concentrated sulfuric acid giving a brownish-yellow coloration and a blue fluorescence. It dissolves in sodium hydroxide solution giving a yellow coloration which by warming the solution turns red-violet. It is hardly soluble in trichlorbenzene and nitrobenzene giving a blue-green coloration. By warming the solution, its coloration turns yellow-green.

Example 21

A suspension of 24.5 parts of leuco-1,4-diaminoanthraquinone in a solution of 4.4 parts of hydrazine hydrate and 7.7 parts of the hydrochloride of hydroxylamine in 200 parts of methanol is boiled, while stirring, until initial material is no longer detectable. After cooling, the reaction product is filtered off by suction and washed with ether. A greenish powder is obtained which dissolves in nitrobenzene and trichlorbenzene giving an orange coloration. It dissolves in concentrated sulphuric acid giving an orange coloration. By pouring this solution into water a red precipitate is obtained.

A similar compound is obtained if phenyl hydrazine is employed instead of hydrazine.

Example 22

24.5 parts of leuco-1,4-diaminoanthraquinone are suspended in a solution of 15 parts of a 25 per cent aqueous methylamine and 7.7 parts of the hydrochloride of hydroxylamine in 245 parts of methanol. The suspension is boiled while stirring, until initial material can no longer be detected. After adding 0.5 part of copper acetate and 3 parts of piperidine oxygen is led through the boiling solution for 6 hours. After cooling, a tough mass is obtained which after drying yields a pulverizable blue mass which dissolves in nitrobenzene and trichlorbenzene giving a bluish-red coloration and in concentrated sulphuric acid giving a yellow coloration.

Example 23

24.5 parts of leuco-1,4-diaminoanthraquinone, 17.3 parts of ω-amino-1-methylnaphthalene and 13.3 parts of betaphenylethylamine are introduced into 250 parts of methanol and boiled, while stirring, until ammonia no longer escapes. During the reaction the leuco compound of the reaction product is partially precipitated in the form of a yellow-green crystalline mass. After addition of 0.5 part of copper acetate and 3 parts of piperidine, oxygen is led through the reaction mixture for several hours. After cooling, the reaction product is filtered off by suction, washed with methanol and water and dried. It is a blue-grey powder which is soluble in concentrated sulphuric acid giving a yellow coloration. When poured into water, the solution yields a blue-green precipitate. The dyestuff dissolves in nitrobenzene and trichlorbenzene giving a blue coloration. It dyes cellulose acetate blue shades. It is ω-amino-1-methylnaphthalene-4-beta-phenylethylamino-anthraquinone.

Example 24

A mixture of 24.5 parts of leuco-1,4-diaminoanthraquinone, 15.8 parts of 8-aminoquinoline, 11.9 parts of phenylhydrazine and 150 parts of trichlorbenzene is boiled, while stirring, until ammonia no longer escapes. After cooling, the reaction product is filtered off by suction, washed with ether and dried. A blue-violet crystal-powder is obtained which dissolves in concentrated sulphuric acid giving a blue coloration, and in trichlorbenzene and nitrobenzene giving a blue-violet coloration. The new dyestuff dyes cellulose acetate blue-violet shades. By dissolving the dyestuff at room temperature in oleum a blue solution is obtained which, after a short time, turns red. By pouring this solution into water a brown-red solution of a sulphonation product of the dyestuff is obtained which by neutralizing turns blue-violet. This solution dyes wool blue-violet shades. It may also be employed for dyeing cotton which is dyed violet shades. It is 1-(quinolyl)-amino-4-phenyl-hydrazino-anthraquinone.

Instead of 8-aminoquinoline, 6-amino- or 3-aminoquinoline may be employed. In these cases similar dyestuffs are obtained.

Example 25

A mixture of 24.5 parts of leuco-1,4-diaminoanthraquinone, 16.2 parts of beta-amino-tetrahydronaphthalene, 11 parts of cyclohexylamine and 245 parts of methanol is boiled, while stirring, until ammonia no longer escapes. After cooling the solution is rendered alkaline by adding sodium hydroxide solution. Oxygen is led through the boiling solution for several hours. After cooling, the reaction product is filtered off by suction, washed with methanol and water and dried. Blue needles are obtained which dissolve in concentrated sulphuric acid giving a yellow coloration, and in trichlorbenzene and nitrobenzene giving a blue coloration. It dyes acetyl cellulose blue-violet shades from soap-baths. It is substantially 1-(tetrahydronaphthyl)-amino-4-(cyclohexyl)-aminoanthraquinone. A similar product is obtained if instead of beta-amino-tetrahydronaphthalene, alpha-amino-tetrahydronapthalene is employed.

Example 26

A suspension of 24.5 parts of leuco-1,4-diaminoanthraquinone in a solution of 13.3 parts of beta-phenylethylamine and 15.8 parts of 8-aminoquinoline in 150 parts of trichlorbenzene is heated, while stirring, at 180° C. until ammonia no longer escapes. After cooling, the reaction product is filtered off by suction and washed with ether. It is a dark blue powder which dissolves in concentrated sulphuric acid giving a brownish-yellow coloration and in trichlorbenzene and nitrobenzene giving a red-violet coloration. It dyes cellulose acetate violet shades. It is 1-(quinolyl)-amino-4-(beta-phenylethyl)-amino-anthraquinone.

Similar reaction products are obtained if instead of beta-phenylethylamine, benzylamine or ω-amino-1-methylnaphthalene, and instead of 8-aminoquinoline, 3- or 6-aminoquinoline or 2-aminopyridine are employed.

Example 27

A mixture of 24.5 parts of leuco-1,4-diaminoanthraquinone, 20 parts of a 25 per cent aqueous solution of methylamine, 2.6 parts of a 95 per cent solution of mono-ethanolamine and 245 parts of methanol is boiled for 6 hours. After adding 0.5 part of copper acetate and 3 parts of piperidine oxygen is led through the solution until it has assumed a blue coloration. After cooling, the reaction product is filtered off by suction and washed with water. It is a blue powder which dissolves in organic solvents giving a blue coloration. It dyes acetyl cellulose blue shades. It comprises a mixture of 1.4-di-monomethylaminoanthraquinone and 1 - methylamino - 4 - hydroxyethylaminoanthraquinone.

*Example 28*

A mixture of 24.5 parts of leuco-1,4-diaminoanthraquinone, 22.3 parts of a 25 per cent aqueous solution of methylamine, 1.5 parts of normal butylamine and 245 parts of methanol is boiled, while stirring, until initial material is no longer detectable what is usually the case after about 6 hours. After adding 0.5 part of copper acetate and 3 parts of piperidine oxygen is led through the solution until it has assumed a blue coloration. After cooling, the reaction product is filtered off by suction and washed with water. It is a blue powder which dissolves in organic solvents giving a blue coloration. It dyes acetyl cellulose blue shades. It comprises a mixture of 1.4-di-monomethylaminoanthraquinone and 1-methylamino-4 - normal - butylaminoanthraquinone.

*Example 29*

A mixture of 24.5 parts of leuco-1,4-diaminoanthraquinone, 10.8 parts of cyclohexylamine and 15.8 parts of 8-aminoquinoline is introduced into 245 parts of methanol. After addition of 23.5 parts of 34.5 per cent aqueous hydrochlorid acid, the mixture is boiled until initial material is no longer detectable. After cooling, the reaction product is filtered off by suction, washed with methanol and dried. It dissolves in concentrated sulphuric acid giving a deep red coloration, and in nitrobenzene giving a greenish coloration. When the solution in nitrobenzene is heated it assumes a blue-green coloration. The dyestuff may be employed for dyeing acetyl cellulose. It is 1 -(quinolyl)- amino - 4 - cyclohexylaminoanthraquinone.

Instead of 8-aminoquinoline 6-aminoquinoline, 3-aminoquinoline or 2-aminopyridine may be employed similar dyestuffs being obtained.

*Example 30*

24.5 parts of leuco-1,4-diaminoanthraquinone are introduced into a solution of 12.9 parts of benzylamine and 8 parts of cyclohexylamine in 245 parts of methanol. The mixture is heated until ammonia no longer escapes. After adding 0.5 part of copper acetate and 3 parts of piperidine oxygen is led through the reaction mixture until it has assumed a readily blue coloration. The reaction product is filtered off by suction and washed with water. It dyes acetyl cellulose violet shades. It is 1-benzylamino-4-cyclohexylaminoanthraquinone.

In an analogous manner beta-phenylethylamine or ω-amino-1-methylnaphthalene may be employed instead of benzylamine. Instead of cyclohexylamine 1- or 2-aminotetrahydronaphthalene may be employed.

*Example 31*

A suspension of 25.5 parts of leuco-1,4,5-triaminoanthraquinone in a solution of 15 parts of a 25 percent aqueous solution of methylamine and 7.2 parts of a 95 per cent solution of ethanolamine in 260 parts of methanol is boiled for 6 hours while stirring. After addition of 0.5 part of copper acetate and 3 parts of piperidine oxygen is led through the boiling mixture until it has assumed a blue coloration. After cooling, the blue reaction product is filtered off by suction and washed with methanol and water. It dyes acetyl cellulose navy blue shades. It is 1-methylamino-4-hydroxyethylamino- 5-aminoanthraquinone.

Instead of methylamine, for example ethylamine, butylamine, propylamine or amylamine may be employed in an analogous manner. Propanolamine or butanolamine may be employed instead of ethanolamine.

*Example 32*

A suspension of 24.5 parts of leuco-1,4-diaminoanthraquinone, 12.8 parts of 8-aminoquinoline and 18.2 parts of 2-aminocarbazole in 150 parts of trichlorbenzene is heated, while stirring, at 180° C. until ammonia no longer escapes. After cooling, the reaction product is filtered off by suction and washed with ethanol and ether. It forms blue-violet needles which dissolve in trichlorbenzene and nitrobenzene giving a blue-green coloration. It is 1-(quinolyl)-amino-4-(carbazyl)-aminoanthraquinone. When treated with sulphonating agents the dyestuff dyes animal fibres green shades.

Similar dyestuffs are obtained if instead of 8-aminoquinoline, 3- or 6-aminoquinoline or 2-aminopyridine and if instead of 2-amino carbazole, 1- or 3-amino-carbazole are employed.

*Example 33*

A suspension of 24.5 parts of leuco-1,4-diaminoanthraquinone in 245 parts of methanol is mixed with 3 parts of normal butylamine and 10.3 parts of ethanolamine. The mixture is boiled, while stirring, until initial material is no longer detectable. After adding 0.5 part of copper acetate and 3 parts of piperidine oxygen is led through the reaction mass until it has assumed a readily blue coloration. After cooling, the reaction product is filtered off by suction, washed with ethanol and water and dried. It is a blue powder, dyeing acetyl cellulose blue shades.

*Example 34*

A suspension of 26.8 parts of leuco-1,4-di-monomethylaminoanthraquinone and 14.4 parts of 8-aminoquinoline in 200 parts of methanol is boiled, while stirring, after an addition of 12 parts of a 34.5 per cent aqueous hydrochloric acid until initial material can no longer be detected. By the reaction one of the methylamino groups is replaced by the radicle of the 8-aminoquinoline, methylamine being split off. After cooling, the dark blue crystals are filtered off by suction, washed with ethanol and water and dried. A beautiful crystallized dark blue powder is obtained, which dissolves in concentrated sulphuric acid giving a red coloration and in trichlorbenzene or nitrobenzene giving a blue coloration. It dyes acetyl cellulose blue-violet shades.

Instead of 8-aminoquinoline in an analogous manner 3- or 6-aminoquinoline or 2-aminopyridine may be employed.

*Example 35*

A suspension of 13.4 parts of leuco-1,4-di-mono-methylaminoanthraquinone and 9.1 parts of 2-aminocarbazole in 100 parts of trichlorbenzene is boiled, while stirring, until initial material can no longer be detected. By the reaction one of the methylamino groups is replaced by the radicle of the 2-aminocarbazole, methylamine being split off. After cooling, the reaction product is filtered off by suction, washed with ethanol and ether and dried. It is a dark blue powder which dissolves in concentrated sulphuric acid giving a red coloration and in nitrobenzene giving a blue-green coloration. It dyes acetyl cellulose green shades from soap-baths.

Similar dyestuffs are obtained if instead of leuco - 1.4 - di-mono-methylaminoanthraquinone, leuco -1.4 - di - mono - ethylaminoanthraquinone, leuco-1.4-di - mono - propylaminoanthraquinone, leuco-1.4-di-mono-butylaminoanthraquinone or substitution products substituted in the anthraquinone nucleus thereof are employed. Instead of 2-aminocarbazole, 1- or 3-aminocarbazole may be employed.

*Example 36*

A mixture of 13.6 parts of leuco 1,4-diamino-5,8-dihydroxyanthraquinone, 3.6 parts of monoethanolamine, 7.5 parts of a 25 per cent aqueous solution of methylamine and 100 parts of methanol are boiled, while stirring, for several hours. After cooling, the leuco compound formed is filtered off by suction and washed with methanol. It is then suspended in methanol, and after adding a little aqueous sodium hydroxide solution, air is led through the solution at 60° C., until it has assumed a readily blue coloration. By working up in the usual manner, 1-methylamino-4-hydroxyethylamino-5.8-dihydroxyanthraquinone is obtained in the form of a blue powder. It dyes acetyl cellulose blue shades.

Similar dyestuffs are obtained, if instead of me hylamine ethylamine, propylamine, butylamine or amylamine are employed. Instead of ethanolamine propanolamine, butanolamine or other alkanolamines may be employed.

*Example 37*

A mixture of 24.5 parts of leuco-1,4-diaminoanthraquinone, 15 parts of a 25 per cent aqueous solution of methylamine, 8.2 parts of propanolamine and 245 parts of methanol is boiled, while stirring, until initial material is no longer detectable. After adding 0.5 part of copper acetate and 3 parts of methylaniline, air is led through the boiling solution until it has assumed a readily blue coloration. After cooling, the thus formed 1- methylamino - 4 - hydroxypropylaminoanthraquinone is filtered off by suction, washed with methanol and then with water and dried. A blue powder is obtained which dyes acetyl cellulose blue shades.

Similar dyestuffs are obtained, if instead of methylamine other alkylamines, as for example ethylamine, propylamine or butylamine are employed. Instead of propanolamine, butanolamine may be employed.

*Example 38*

A suspension of 24.5 parts of leuco-1,4-diaminoanthraquinone in a solution of 15 parts of a 25 per cent aqueous solution of methylamine and 8 parts of butylamine in 245 parts of methanol is stirred at room-temperature until initial material can no longer be detected. By filtering off by suction and washing with methanol, 1-methylamino-4-butylaminoanthraquinone is obtained in the form of beautiful blue crystals. It dyes acetyl cellulose clear blue shades.

*Example 39*

A mixture of 13.6 parts of leuco-1,4-di-mono-methylaminoanthraquinone, 5.9 parts of benzylamine, 5.5 parts of cyclohexylamine and 130 parts of methanol is boiled, while stirring, until initial material is no longer detectable. After cooling the 1 - benzylamino - 4 - cyclohexylaminoanthraquinone is obtained in the form of a blue crystalline powder which dyes acetyl cellulose blue shades.

What we claim is:

1. A process of producing N-substitution products of 1,4-diaminoanthraquinones which comprises condensing a leuco compound of a 1,4-diaminoanthraquinone with at least two different amines corresponding to the general formula R.NH₂ wherein R stands for a member of the group consisting of —OH, —NH₂, —NH-aryl, alkyl, aralkyl, cycloalkyl and heterocyclic radicles.

2. A process of producing N-substitution products of 1,4-diaminoanthraquinones which comprises condensing a leuco compound of a 1,4-diaminoanthraquinone with at least two different amines corresponding to the general formula R.NH₂ wherein R stands for a member of the group consisting of —OH, —NH₂, —NH-aryl, alkyl, aralkyl, cycloalkyl and heterocyclic radicles in the presence of an acid condensing agent.

3. A process of producing N-substitution products of 1,4-diaminoanthraquinones which comprises condensing a leuco compound of a 1,4-diaminoanthraquinone with at least two different amines corresponding to the general formula R.NH₂ wherein R stands for a member of the group consisting of —OH, —NH₂, —NH-aryl, alkyl aralkyl, cycloalkyl and heterocyclic radicles an alkyl, in the presence of a mineral acid.

4. A process of producing N-substitution products of 1,4-diaminoanthraquinones which comprises condensing a leuco compound of a 1,4-diaminoanthraquinone with the mineral acid salts of at least two different amines corresponding to the general formula R.NH₂ wherein R stands for a member of the group consisting of —OH, —NH₂, —NH-aryl, alkyl, aralkyl, cycloalkyl and heterocyclic radicles.

5. A process of producing N-substitution products of 1,4-diaminoanthraquinones which comprises condensing a leuco compound of a 1,4-diaminoanthraquinone with a small excess of at least two different amines corresponding to the general formula R.NH₂ wherein R stands for a member of the group consisting of —OH, —NH₂, —NH-aryl, alkyl aralkyl, cycloalkyl and heterocyclic radicles in the presence of an oxidizing agent.

6. A process of producing N-substitution products of 1,4-diaminoanthraquinones which comprises condensing a leuco compound of a 1,4-diaminoanthraquinone with a small excess of at least two different amines corresponding to the general formula R.NH₂ wherein R stands for a member of the group consisting of —OH, —NH₂, —NH-aryl, alkyl, aralkyl, cycloalkyl and heterocyclic radicles in the presence of oxygen.

7. A process of producing N-substitution products of 1,4-diaminoanthraquinones which comprises condensing a leuco compound of a 1,4-diaminoanthraquinone with at least two different amines corresponding to the general formula R.NH₂ wherein R stands for a member of the group consisting of —OH, NH₂, —NH-aryl, alkyl, aralkyl, cycloalkyl and heterocyclic radicles in the presence of a copper-containing substance.

8. A process of producing N-substitution products of 1,4-diaminoanthraquinones which comprises condensing a leuco compound of a 1,4-diaminoanthraquinone with at least two different amines corresponding to the general formula R.NH₂ wherein R stands for a member of the group consisting of —OH, —NH₂, —NH-aryl, alkyl, aralkyl, cycloalkyl and heterocyclic radicles in the presence of a copper salt and of an organic base selected from the class consisting of secondary and tertiary amines.

9. A process of producing N-substitution products of 1,4-diaminoanthraquinones which comprises condensing a leuco compound of a 1,4-diaminoanthraquinone with at least two different amines corresponding to the general formula R.NH₂ wherein R stands for a member of the group consisting of —OH, —NH₂, —NH-aryl, alkyl, aralkyl, cycloalkyl and heterocyclic radicles in the presence of a copper salt and piperidine.

10. A process of producing N-substitution products of 1,4-diaminoanthraquinones which comprises condensing a leuco compound of a 1,4-diaminoanthraquinone with at least two different amines corresponding to the general formula R.NH₂ wherein R stands for a member of the group consisting of —OH, —NH₂, —NH-aryl, alkyl, aralkyl, cycloalkyl and heterocyclic radicles in the presence of an inert diluent.

11. A process of producing N-substitution products of 1,4-diaminoanthraquinones which comprises condensing a leuco compound of a 1,4-diaminoanthraquinone with at least two different amines corresponding to the general formula R.NH₂ wherein R stands for a member of the group consisting of —OH, —NH₂, —NH-aryl, alkyl, aralkyl, cycloalkyl and heterocyclic radicles in the presence of water.

12. A process of producing N-substitution products of 1,4-diaminoanthraquinones which comprises condensing a leuco compound of a 1,4-diaminoanthraquinone with at least two different amines corresponding to the general formula R.NH₂ wherein R stands for a member of the group consisting of —OH, —NH₂, —NH-aryl, alkyl, aralkyl, cycloalkyl and heterocyclic radicles in the presence of an aliphatic alcohol of low molecular weight.

13. A process of producing N-substitution products of 1,4-diaminoanthraquinones which comprises condensing a leuco compound of a 1,4-diaminoanthraquinone with at least two different amines corresponding to the general formula R.NH₂ wherein R stands for a member of the group consisting of —OH, —NH₂, —NH-aryl, alkyl, aralkyl, cycloalkyl and heterocyclic radicles in the presence of trichlorbenzene.

14. A process of producing N-substitution products of 1,4-diaminoanthraquinones which comprises condensing the leuco compound of 1,4-diaminoanthraquinone with at least two different amines corresponding to the general formula R.NH₂ wherein R stands for a member of the group consisting of —OH, —NH₂, —NH-aryl, alkyl, aralkyl, cycloalkyl and heterocyclic radicles.

15. A process of producing N-substitution products of 1,4-di-mono-alkylaminoanthraquinone with less than two molecular proportions of an amine corresponding to the general formula R.NH₂ wherein R stands for a member of the group consisting of —OH, —NH₂, —NH-aryl, aralkyl, cycloalkyl and heterocyclic radicles.

16. 1,4-diaminoanthraquinones corresponding to the general formula:

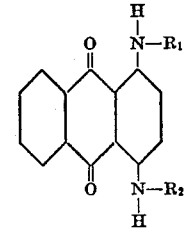

wherein R₁ and R₂ are different from each other and stand for a member of the group consisting of —OH, —NH₂, —NH-aryl, alkyl, aralkyl, cycloalkyl and heterocyclic radicles.

17. 1,4-diaminoanthraquinones of the group consisting of compounds corresponding to the general formula:

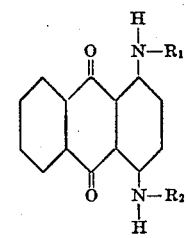

wherein R₁ and R₂ are different from each other and stand for a member of the group consisting of —OH, —NH₂, —NH-aryl, alkyl, aralkyl, cycloalkyl and heterocyclic radicles and compounds of the above formula wherein the anthraquinone nucleus contains a substituent selected from the class consisting of halogen, the amino, hydroxy, methoxy and carboxylic acid group.

18. 1,4-diaminoanthraquinones corresponding to the general formula:

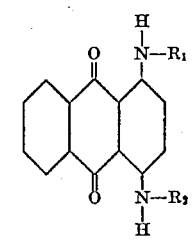

wherein R₁ stands for an alkyl group and R₂ for a member of the group consisting of —OH, —NH₂, —NH-aryl, aralkyl, cycloalkyl and heterocyclic radicles.

19. 1,4-diaminoanthraquinones corresponding to the general formula:

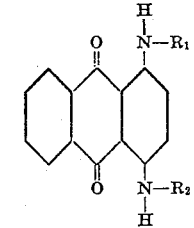

wherein R₁ stands for a heterocyclic radicle and R₂ for a member of the group consisting of —OH, —NH₂, —NH-aryl, alkyl, aralkyl and cycloalkyl radicles.

20. 1,4-diaminoanthraquinones corresponding to the general formula:

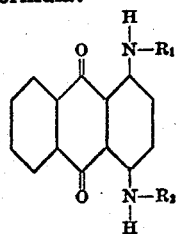

wherein $R_1$ stands for an aralkyl group and $R_2$ for a member of the group consisting of —OH, —NH$_2$, —NH-aryl, alkyl, cycloalkyl and heterocyclic radicles.

21. 1,4-diaminoanthraquinones corresponding to the general formula:

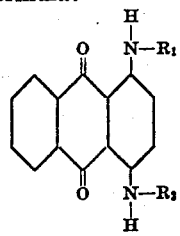

wherein $R_1$ stands for a cycloalkyl group and $R_2$ for a member of the group consisting of —OH, —NH$_2$, —NH-aryl, alkyl, aralkyl and heterocyclic radicles.

22. 1,4-diaminoanthraquinones corresponding to the general formula:

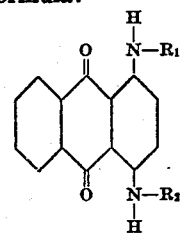

wherein $R_1$ and $R_2$ are alkyl radicles different from each other.

23. 1,4-diaminoanthraquinones corresponding to the general formula:

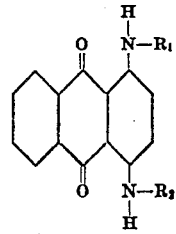

wherein $R_1$ stands for a hydroxyalkyl group and $R_2$ for an alkyl group.

24. The 1,4-diaminoanthraquinone corresponding to the formula:

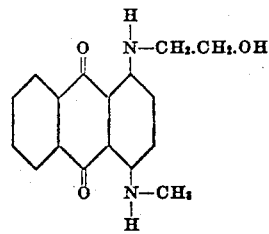

25. The 1,4-diaminoanthraquinone corresponding to the formula:

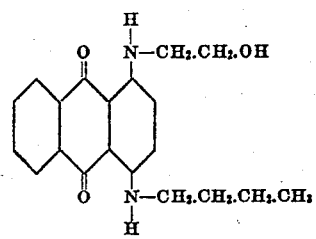

26. A process of producing N-substitution products of 1,4-diaminoanthraquinones which comprises condensing a leuco compound of a 1,4-diaminoanthraquinone with at least two different primary amines.

KARL KOEBERLE.
ROBERT SCHWEIZER.
CHRISTIAN STEIGERWALD.

DISCLAIMER 2,050,704.—*Karl Koeberle, Robert Schweizer,* and *Christian Steigerwald,* Ludwigshafen-on-the-Rhine, Germany. PROCESS OF PRODUCING N-SUBSTITUTION PRODUCTS OF 1,4-DIAMINOANTHRAQUINONES. Patent dated August 11, 1936. Disclaimer filed June 27, 1939, by the assignee, *General Aniline Works, Inc.*

Hereby disclaims from claims 16 and 17 all compounds included within the given general formulae when $R_1$ and $R_2$ stand for alkyl, aralkyl or cycloalkyl.

Hereby disclaims from claim 18 all compounds included within the given general formula when $R_2$ is aralkyl or cycloalkyl.

Hereby disclaims from claim 20 all compounds included within the given general formula when $R_2$ is alkyl or cycloalkyl.

Hereby disclaims from claim 21 all compounds included within the given general formula when $R_2$ is alkyl or aralkyl.

Hereby disclaims claims 22 and 23.

[*Official Gazette July 18, 1939.*]